Figure 1:
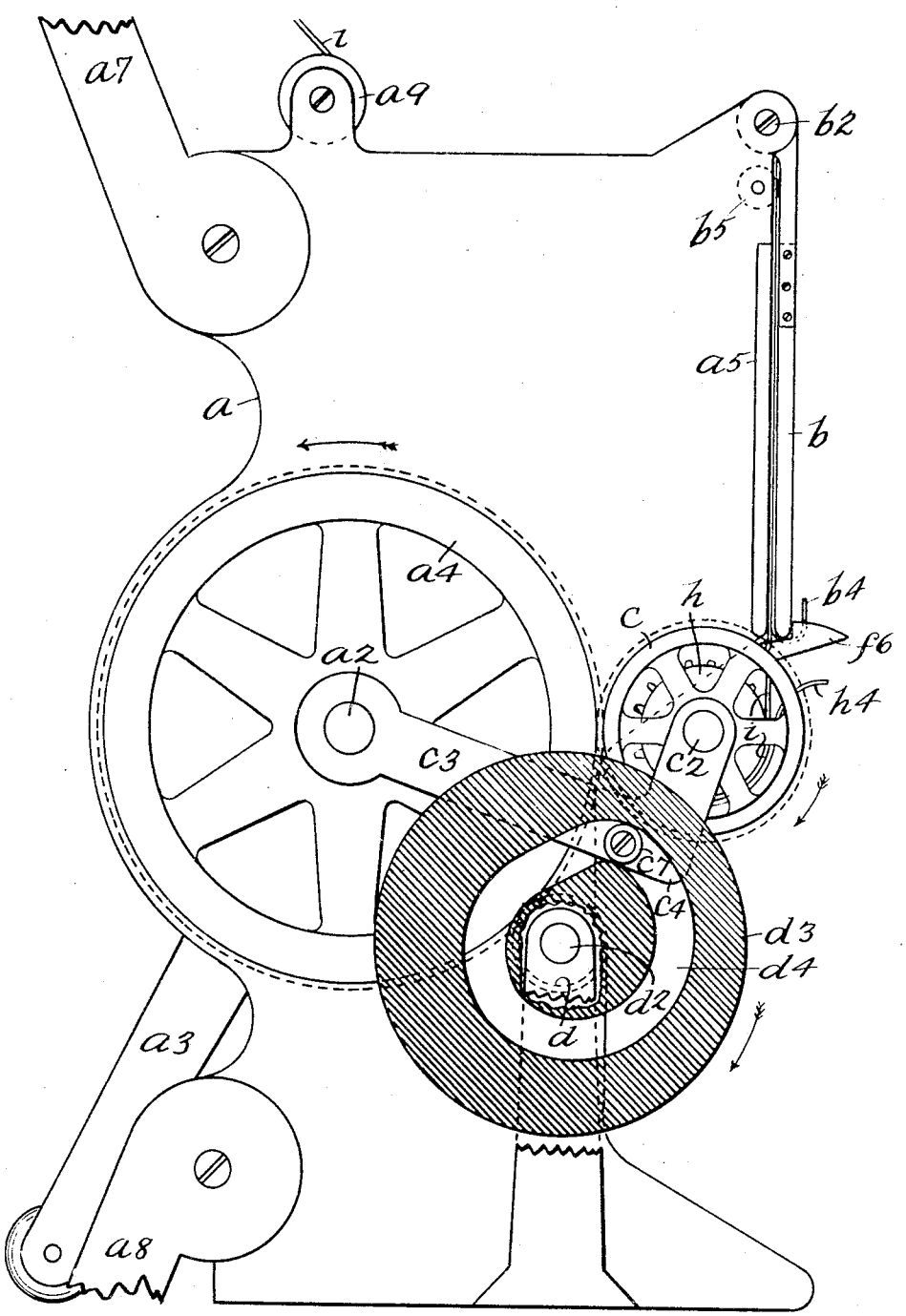

G. W. BINGHAM.
KINETOSCOPE.
APPLICATION FILED JUNE 24, 1908.

963,740.

Patented July 12, 1910.

3 SHEETS—SHEET 1.

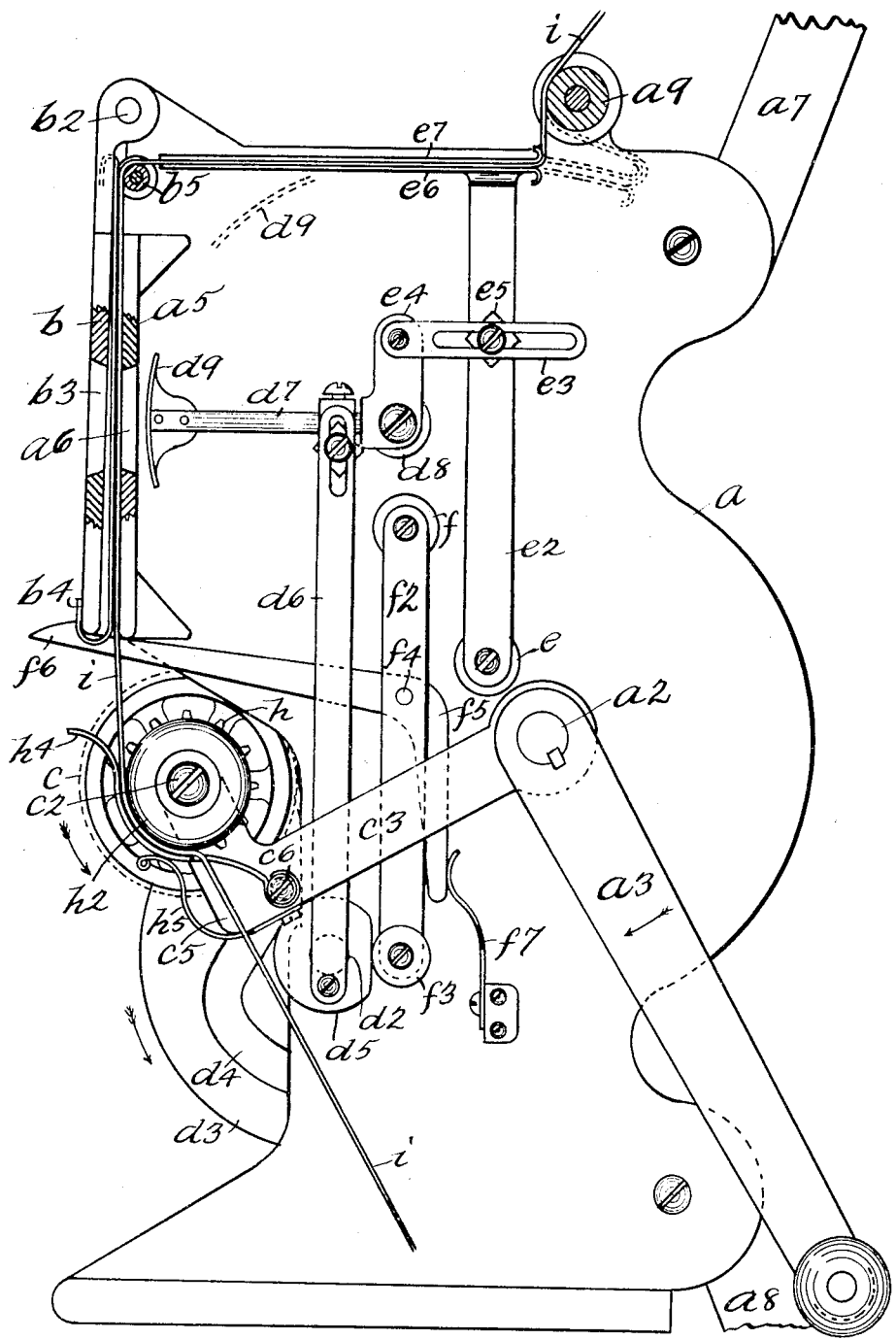

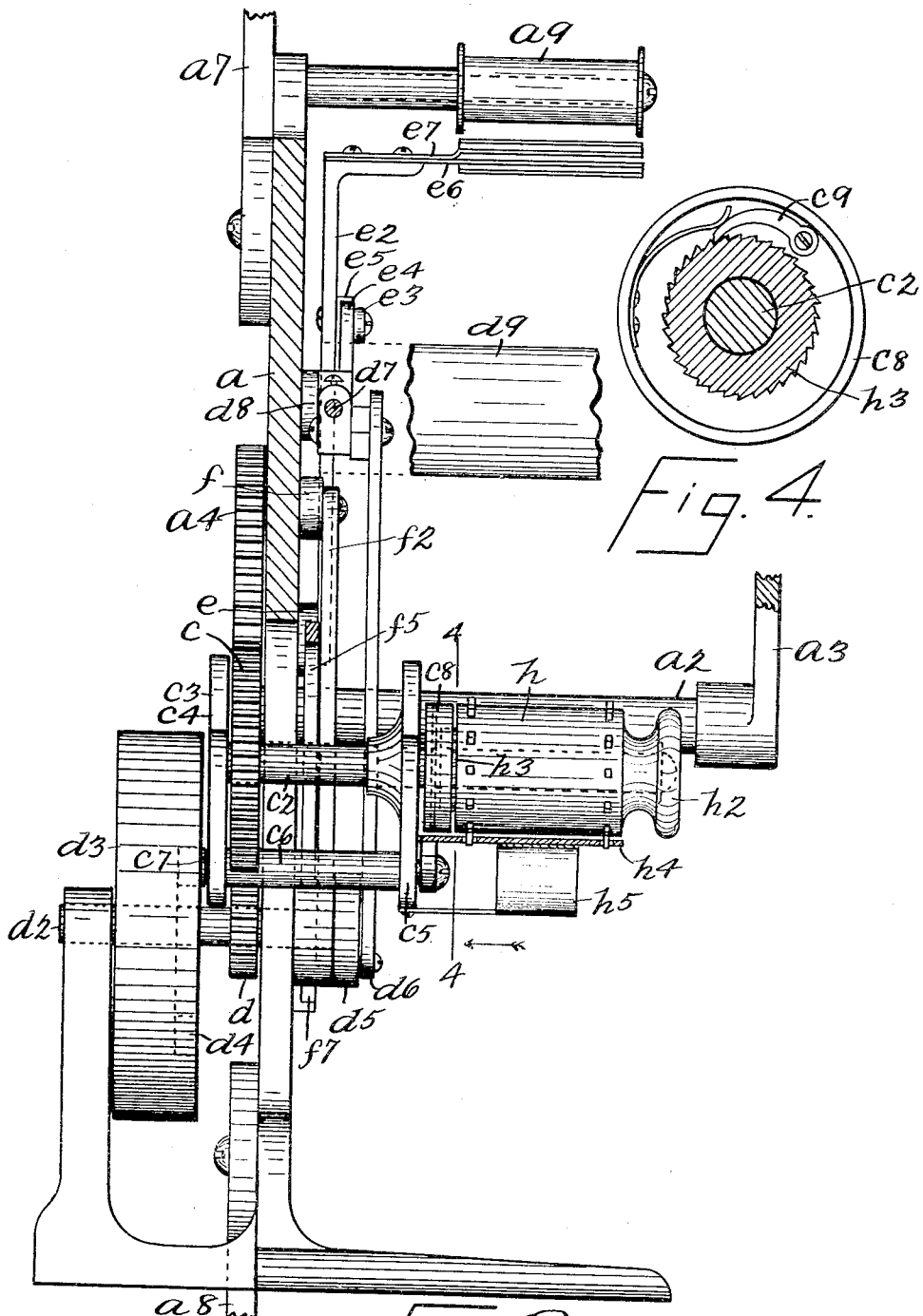

ns.

UNITED STATES PATENT OFFICE.

GEORGE W. BINGHAM, OF BROOKLYN, NEW YORK, ASSIGNOR TO THE BINGHAM MANUFACTURING COMPANY, A CORPORATION OF MAINE.

KINETOSCOPE.

963,740.  Specification of Letters Patent.  Patented July 12, 1910.

Application filed June 24, 1908. Serial No. 440,077.

*To all whom it may concern:*

Be it known that I, GEORGE W. BINGHAM, a citizen of the United States of America, and residing at Brooklyn, in the county of Kings and State of New York, have invented certain new and useful Improvements in Kinetoscopes, of which the following is a specification, such as will enable those skilled in the art to which it appertains to make and use the same.

The present invention relates generally to moving picture machines, and has more particularly reference to the film advancing means.

The objects of the invention are to simplify the structure, to control the film during its movements so as to insure absolute register with the exposure opening, and to facilitate the "framing" of the picture.

In carrying out the above objects the invention embraces an intermittent loop producing device located above the exposure opening, together with a film sprocket located below the exposure opening. This film sprocket has a combined rotary and bodily oscillating movement, and is adapted on the downward stroke of its oscillation to advance the film intermittently past the exposure opening. The oscillation of this sprocket is so timed that the downward stroke is relatively quick while the upward stroke is relatively slow, and is so related to the rotation of the sprocket that, as the sprocket bodily ascends, it will rotate at a sufficient speed to prevent any slack in the film due to the bodily upward movement of the sprocket. The loop producing means above the exposure opening is so timed that its active stroke, when producing the loop, takes place during the upward stroke of the sprocket. Interposed between the loop producing device and the rotary and oscillating sprocket is an intermittently operated clamp for clamping the exposed portion of the film, the pressure being applied when the loop producing device is on its active stroke and when the sprocket is moving bodily upward, and the pressure being released when the loop forming device is on its return stroke and the sprocket is on its downward stroke. Means are further provided for framing the picture by rotating the sprocket independently of the rotation caused by the operation of the machine.

Other features will appear as the specification proceeds.

In the accompanying drawings there is illustrated a preferred embodiment of the invention, but it will be understood that various changes and modifications may be made therein without departing from the spirit and scope of the invention.

In the drawings: Figure 1 is a side elevation of a preferred form of the machine with the parts in position at the beginning of the film advancing stroke, the film advancing cam being shown in section. Fig. 2 is a similar view of the other side of the machine with the parts at the end, or approximately at the end of the film advancing movement. Here, also certain of the parts are broken away and shown in section. Fig. 3 is a rear view of the machine with the apertured film supporting and clamping members removed and a portion of the frame shown in section. Fig. 4 is an enlarged sectional view of the adjustable means for framing the picture, taken on the line 4—4 of Fig. 3.

Similar reference characters refer to like parts throughout the several views.

The frame $a$, of the machine, is of a suitable construction and there may be attached thereto a pair of adjustable arms $a^7$ and $a^8$, for the support of the film holder and receiver respectively.

The film $i$ is led from the film support down over two guide rolls, $a^9$ and $b^5$, and interposed between said guide rolls, there is preferably a loop forming device, which may be in the form of a pair of spaced parallel plates $e^6$, $e^7$, between which the film passes. This loop producing device is reciprocated or oscillated intermittently so as to form a loop in the film between the two guide rolls, as in the manner indicated in dotted lines, Fig. 2. The looping device may be carried, as in the present instance, by a bar $e^2$, pivoted to swing on the support $e$, the bar being oscillated by means of a link connection $e^3$, with an oscillatory arm $e^4$. The link may be slotted as shown, to permit adjustment of the parts and in order to allow for a certain swinging movement of the link it may have connection with a member $e^5$ rotatably secured to the bar $e^2$. The film passes from the guide roll $b^5$ down over the face of the member $a^5$, which is apertured at $a^6$, to provide an exposure opening.

There is preferably associated with the apertured member, a clamping member $b$, movable toward and away from the apertured member and in order to allow this movement the clamping member may be swung from the pivot $b^2$. The clamp thus formed is preferably operated to hold the film during the exposure periods and to release the pressure on the film while the film is being advanced past the exposure opening. This may be done by providing springs $b^4$ which exert their tension to release the clamping member from holding engagement with the member $a^5$ and a hook member $f^6$ engaging the lower edge of the door or clamping member and tending to pull the said door into clamping engagement with the window member $a^5$. The clamping member is provided with an aperture $b^3$ corresponding to the exposure opening in the member $a^5$. The hook member may be supported and actuated by any suitable means. I have herein shown the same as pivotally supported at the point $f^4$ on the depending lever $f^2$ pivoted to swing from the support $f$. A spring $f^7$ exerts its tension to hold the hook in engagement with the lower edge of the door or clamping member and the spring also has a tendency to push the hook outward so as to relieve the pressure of the clamping member. The pressure of the clamp may be intermittently released as by means of a cam $d^5$ fixed on the inner end of the shaft $d^2$ and engaging a cam roll on the lower end of the lever $f^2$. As is illustrated in Fig. 2, this cam has a concentric portion for the greater part of its circumference and a flattened portion which when in engagement with the cam roll $f^3$, as in Fig. 2, permits the spring to push the hook outward and thereby relieve the pressure of the clamping member.

The means for intermittently advancing the film here consists of a film advancing roll which in the present instance is in the form of a film sprocket $h$. This film sprocket is given, by any suitable means, a combined rotary and oscillatory movement. These means preferably consist of a drive gear $a^4$ on the main driving shaft $a^2$ which meshes with a gear $c$ on the sprocket shaft $c^2$ for imparting the rotary motion and a member $d^3$ provided with a cam groove $d^4$ in which is engaged a cam roller $c^7$ carried by the oscillatory frame $c^3$, which frame is made up of side members $c^4$ and $c^5$ between which is journaled the sprocket shaft; the cam serving to impart the oscillatory movement to the frame and the film sprocket carried thereby. The oscillatory frame $c^3$ is journaled upon the same center as the drive gear $a^4$ so that the gears $a^4$ and $c$ shall always be in mesh. The cam member $d^3$ may serve in the capacity of a balance wheel and it may be mounted upon the outer end of the shaft $d^2$ which carries the other cam $d^5$. This cam shaft may be driven direct from the main drive gear by means of a pinion $d$ meshing with said drive gear. The film is held in proper engagement with the film sprocket by means of a guard $h^4$, the guard being properly positioned by a spring $h^5$ which permits the guard to be withdrawn for the insertion of the film.

As will be noted in Fig. 1, the cam is of peculiar shape, consisting of an abrupt or almost radially disposed portion (upon which the cam roll is just about to enter, in Fig. 1) and a gradually rising portion extending from the base of the abrupt portion in an ever increasing sweep to the top or apex of the abrupt cam portion. It will be apparent from an inspection of Fig. 1, that as the cam rotates in the direction of the arrow, the abrupt portion of the cam, by means of the cam roll in engagement therewith, will cause the film sprocket to be lowered with a quick movement or jerk and the sprocket will then again be returned to the top of its oscillatory stroke by a slower and more gradual ascending movement.

The clamp actuating cam is so timed that as the sprocket begins its quick downward oscillatory movement, the pressure on the film is released and the film is free to be jerked down past the exposure opening an amount substantially equal to the downward stroke of the sprocket. Upon its upward movement, the sprocket simply winds up on the film at the proper speed to hold that portion of the film below the clamp in a substantially taut condition. During this slow upward movement of the sprocket, the looper or loop producing device is reciprocated, substantially as shown in dotted lines in Fig. 2, to produce a loop below the guide roll $a^9$. Upon the downward stroke of the film sprocket, therefore, the film is advanced past the exposure opening an amount substantially equal to that of the loop formed just previous to the downward stroke of the sprocket. Also, the parts are preferably so timed that the looper, after producing the loop, retreats at substantially the same speed as the film is advanced, so that the film is looped without producing any slack or looseness therein.

The shutter and looper may be conveniently connected to operate in unison. This may be done by providing the arm $d^7$ which carries the shutter blade $d^9$, with an angular projection $e^4$, to which the connecting link is secured, as already described. Movement may be imparted to the shutter arm by means of a connecting link $d^6$ having its other end connected to the cam $d^5$, as substantially shown in Fig. 2.

For the purpose of framing the pictures on the film with respect to the exposure opening, the film sprocket is preferably arranged so as to be capable of a certain adjustment for advancing the film. This may be done by mounting the sprocket loose on the sprocket carrying shaft and providing the sprocket with a head $h^2$, by means of which it may be turned independent of its supporting shaft. An adjustable driving connection is provided between the shaft and sprocket. This may be in the form of a fixed member $c^8$ on the shaft carrying spring pressed pawl $c^9$ for engagement with a ratchet $h^3$ on the end of the sprocket. These features are clearly illustrated in Figs. 3 and 4. It will be evident that the sprocket may be turned independently of its shaft in a forward direction to advance the film and frame the pictures with respect to the exposure opening as much as desired. This pawl and ratchet mechanism normally acts only as a means of driving connection between the sprocket and its shaft, but it is available at any time for the purpose of advancing the film as much as desired, for framing or other purposes.

The machine may be operated manually or by suitable power. In the case of manual operation, the main drive shaft $a^2$ would preferably have applied thereto an operating crank $a^3$.

It will be understood that this invention and the various features thereof may be used equally as well with the camera for taking the pictures as with the projecting apparatus for exhibiting the same.

What is claimed, is:

1. In a moving picture machine provided with an exposure opening, a film advancing roll, means for rotating and for imparting an oscillatory movement to the film advancing roll, an intermittently operated loop producing device adapted to form a loop in the film during the upward oscillatory movement of the film advancing roll, and said roll adapted during its downward oscillatory movement to advance the film past the exposure opening an amount substantially equal to the amount of loop so produced.

2. In a moving picture machine provided with an exposure opening, a film advancing roll, means for rotating and for imparting an oscillatory movement to the film advancing roll, an intermittently operated loop producing device adapted to form a loop in the film during the upward oscillatory movement of the film advancing roll, said roll adapted during its downward oscillatory movement to advance the film past the exposure opening an amount substantially equal to the amount of loop produced, a clamp, and means for operating the clamp to hold the film during the upward movement of the film advancing roll and to release the pressure of the clamp during the downward movement of the film advancing roll.

3. In a moving picture machine provided with an exposure opening, a film advancing roll, means for rotating and for imparting an oscillatory movement to the film advancing roll, means for rotatively adjusting said roll to frame the pictures on the film with respect to the exposure opening, an intermittently operated loop producing device adapted to form a loop in the film during the upward oscillatory movement of the film advancing roll, and said roll adapted during its downward oscillatory movement to advance the film past the exposure opening an amount substantially equal to the amount of loop so produced.

4. In a moving picture machine having an exposure opening, film feeding means comprising an intermittently acting loop producing device located above the exposure opening, film advancing means located below the exposure opening, means for rotating and oscillating said film advancing means, and an intermittent film clamp located intermediate the loop producing device and the film advancing means adapted to clamp the exposed portion of the film when the film advancing means is on its upward stroke and when the loop producing device is forming the loop.

5. In a moving picture machine provided with an exposure opening, a film advancing roll, means for imparting a combined rotary and oscillatory motion to the film advancing roll whereby upon the oscillatory movement of the film in one direction, the film will be intermittently advanced past the exposure opening, and a loop forming device actuated upon the movement of the film advancing roll in the opposite direction to produce a loop in the body of the film.

6. In a moving picture machine, a member having an exposure opening therein, a driving gear, a frame movable radially about said driving gear, a driven gear journaled in said frame and in mesh with the driving gear, a film advancing roll, rotated by the driven gear, means for oscillating the frame whereby upon the downward stroke of the frame and sprocket carried thereby the film will be intermittently advanced past the exposure opening, a clamp, means for operating said clamp to hold the film during the upward movement of the advancing roll and to release the pressure of the clamp during the downward stroke of the advancing roll, and an intermittently operated loop producing device located in advance of the clamp and adapted to produce a loop in the film during the upward movement of the film advancing roll.

7. In a moving picture machine, a window member having an exposure opening therein, a guide roll located at the upper end of said window member, a second guide roll located in rear of the first guide roll, a guide for the film located between the guide rolls, comprising a pair of spaced parallel guide plates between which the film is passed, and means for oscillating said guide to intermittently form a loop in the film between the guide rolls.

8. In a moving picture machine, a window member having an exposure opening therein, a guide roll located at the upper end of said window member, a second guide roll located in rear of the first guide roll, a guide for the film located between the guide rolls comprising a pair of spaced parallel guide plates between which the film is passed, means for oscillating said guide to intermittently form a loop in the film between the guide rolls, and means for intermittently advancing the film down past the exposure opening an amount substantially equal to the loop so formed by the guide.

9. In a moving picture machine, a window member having an exposure opening therein, a guide roll located at the upper end of said window member, a second guide roll located in rear of the first guide roll, a guide for the film located between the guide rolls, means for oscillating said guide to intermittently form a loop in the film between the guide rolls, a film sprocket located below the exposure opening, means for continuously rotating the film sprocket, and means for intermittently oscillating the sprocket to draw the film down past the exposure opening an amount substantially equal to that of the loop produced by the aforesaid guide.

10. In a moving picture machine, a window member having an exposure opening therein, a guide roll located at the upper end of said window member, a second guide roll located in rear of the first guide roll, a guide for the film located between the guide rolls, means for oscillating said guide to intermittently form a loop in the film between the guide rolls, means for intermittently advancing the film down past the exposure opening an amount substantially equal to the loop so formed by the guide, a clamp for holding the film during exposure periods, and means for releasing the pressure of the clamp during the intermittent advancement of the film.

11. In a moving picture machine, a window member having an exposure opening therein, a guide roll located at the upper end of said window member, a second guide roll located in rear of the first guide roll, a guide for the film located between the guide rolls, means for oscillating said guide to intermittently form a loop in the film between the guide rolls, a film sprocket located below the exposure opening, means for continuously rotating the film sprocket, means for oscillating the sprocket to intermittently draw the film down past the exposure opening an amount substantially equal to that of the loop produced by the aforesaid guide, a clamping member associated with the window member to hold the film during exposure periods, and means for releasing the pressure of the clamping member during the intermittent advancing movement of the film.

12. In a moving picture machine, a sprocket shaft and a film sprocket loosely mounted thereon, a fixed driving member on said shaft, a gear on the shaft, a driving gear meshing therewith for imparting rotation to the shaft, pawl and ratchet connection between the fixed driving member and sprocket whereby the sprocket may be independently adjusted on the shaft, and means for imparting a bodily oscillatory movement to the sprocket for intermittently advancing the film.

13. In a moving picture machine provided with an exposure opening, a clamp for holding the film during exposure periods, a shaft and a film sprocket loosely mounted thereon, a gear on the shaft, a driving gear meshing therewith for imparting rotation to the shaft, a fixed driving member on the shaft, adjustable connection between the sprocket and fixed driving member whereby the sprocket may be independently adjusted on the shaft to frame the pictures on the film with respect to the exposure opening, means for bodily oscillating the sprocket so as to intermittently advance the film past the exposure opening, and means for releasing the pressure of the clamp during the intermittent advancing movement of the film.

14. In a moving picture machine provided with an exposure opening, an intermittently operated loop forming device located above the exposure opening, a sprocket shaft and a film sprocket loosely mounted thereon, a gear on the shaft, a driving gear meshing therewith for imparting rotation to the shaft, a fixed driving member on the shaft, adjustable connection between the sprocket and fixed driving member so that the sprocket may be independently adjusted on the shaft to frame the pictures on the film with respect to the exposure opening, and means for oscillating the film sprocket so as to intermittently advance the film past the exposure opening an amount substantially equal to the loop produced by the loop forming device.

15. In a moving picture machine provided with an exposure opening, an intermittently operated loop forming device located above the exposure opening, a sprocket shaft and a film sprocket loosely mounted thereon, a gear on the shaft, a driving gear meshing therewith for imparting rotation to the shaft, a fixed driving member on the shaft, adjustable connection between the sprocket and fixed driving member so that the sprocket may be independently adjusted on the shaft to frame the pictures on the film with respect to the exposure opening, means for oscillating the film sprocket so as to intermittently advance the film past the exposure opening an amount substantially equal to the loop produced by the loop forming device, a clamp adapted to hold the film during exposure periods, and means for releasing the pressure of the clamp during the intermittent advancing movement of the film.

16. In a moving picture machine having an exposure opening, an intermittently operated loop forming device located above the exposure opening, a film sprocket located below the exposure opening, means for rotating said sprocket, means for oscillating the film sprocket with a comparatively slow upward movement and a quick downward movement so that upon its upward movement the sprocket will wind up and hold the film below the exposure opening substantially taut, and upon its downward movement the sprocket will jerk down an amount of film past the exposure opening substantially equal to the loop produced by the loop forming device.

17. A moving picture machine having an exposure opening, a clamp for holding the portion of the film being exposed, a film sprocket, means for rotating the sprocket, means for oscillating the sprocket with a slow upward movement whereby the sprocket will wind up and hold taut the portion of film below the clamp and with a relatively quick downward movement to intermittently advance the film past the exposure opening, means adapted to release the pressure of the clamp during the downward movement of the sprocket, and a loop forming device located above the exposure opening and adapted to produce a loop in the film during the upward movement of the film sprocket.

18. In a kinetoscope provided with the usual intermittent film moving devices, a film carrier interposed between the delivery magazine and said moving devices, means for actuating said carrier to produce a loop in the film between said intermittent movements, and means for adjusting the degree of said carrier movement.

19. In a kinetoscope provided with the usual intermittent film moving devices, a film tension device, means for producing a loop in the film between said intermittent movements and means connecting said tension means and said loop forming means whereby the latter is operating when the former is at rest.

20. In a moving picture machine provided with an exposure opening, a film advancing roll, means for rotating and for imparting an oscillatory movement to the film advancing roll, whereby upon the downward oscillatory motion of the roll, the film will be advanced past the exposure opening, a clamp for the portion of the film being exposed, and means for operating the clamp to hold the film during the upward movement of the film advancing roll, and to release the pressure of the clamp to allow the film to move freely during the downward movement of the film advancing roll.

21. In a moving picture machine provided with an exposure opening, a clamp adapted to hold that portion of the film being exposed, means for intermittently advancing the film past the exposure opening, means adapted to release the pressure of the clamp at the time of such intermittent film movements, and an intermittently operated loop producing device located in advance of the exposure opening and adapted to intermittently produce a loop in the film at the time the film is being held by the clamp.

22. In a moving picture machine provided with an exposure opening, a film advancing roll located in rear of the exposure opening, means for imparting an oscillatory movement to the film advancing roll, an intermittently operated loop producing device located in advance of the exposure opening adapted to form a loop in the film during the upward oscillatory movement of the film advancing roll, and said roll adapted during its downward oscillatory movement to advance the film past the exposure opening an amount substantially equal to the amount of loop so produced.

In testimony that I claim the foregoing as my invention I have signed my name in presence of the subscribing witnesses this 23rd day of June, 1908.

GEORGE W. BINGHAM.

Witnesses:
Wm. T. Fishbough,
A. J. Motilan.